United States Patent
Kölhi et al.

(10) Patent No.: US 10,284,894 B2
(45) Date of Patent: May 7, 2019

(54) METHODS AND APPARATUS FOR NAMING VIDEO CONTENT CHUNKS

(71) Applicant: Telefonaktiebolaget LM Ericsson (publ), Stockholm (SE)

(72) Inventors: Johan Kölhi, Stockholm (SE); Michael Huber, Stockholm (SE); Börje Ohlman, Stockholm (SE); Saurabh Singh, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 185 days.

(21) Appl. No.: 15/116,161

(22) PCT Filed: Feb. 3, 2014

(86) PCT No.: PCT/EP2014/052057
§ 371 (c)(1),
(2) Date: Aug. 2, 2016

(87) PCT Pub. No.: WO2015/113644
PCT Pub. Date: Aug. 6, 2015

(65) Prior Publication Data
US 2017/0180774 A1    Jun. 22, 2017

(51) Int. Cl.
*H04N 21/2747* (2011.01)
*H04H 60/73* (2008.01)
(Continued)

(52) U.S. Cl.
CPC ......... *H04N 21/2747* (2013.01); *G06F 16/40* (2019.01); *G06F 17/30017* (2013.01);
(Continued)

(58) Field of Classification Search
CPC ............ H04N 21/2181–21/2747; H04N 21/632–21/64322; H04N 7/17318;
(Continued)

(56) References Cited

U.S. PATENT DOCUMENTS 8,099,605 B1  1/2012  Billsrom et al.
9,106,943 B2 *  8/2015  Killick ................. H04N 21/274
(Continued)

FOREIGN PATENT DOCUMENTS

WO    WO 2006/125225    11/2006
WO    WO 2013/106590    7/2013

OTHER PUBLICATIONS

PCT International Search Report for International application No. PCT/EP2014/052057—dated Oct. 31, 2014.

*Primary Examiner* — Alicia Baturay
*Assistant Examiner* — Rajeshwari Krishnan
(74) *Attorney, Agent, or Firm* — Patent Portfolio Builders, PLLC

(57) ABSTRACT

A method for generating a filename for a chunk of streamed video content is disclosed. The method comprises performing a cryptographic hash function on data associated with the chunk of video content (100A) and setting the output hash value of the cryptographic hash function as the chunk filename (100B). A method for recording broadcast video content by a user device is also disclosed. The method comprises receiving a chunk of broadcast video content (310), generating a filename for the received chunk of video content (320) and storing the generated filename in a user specific storage (330). A method for broadcasting a chunk of video content is also disclosed. The method comprises generating metadata corresponding to the chunk of video content (550), the metadata comprising at least one parameter for generating a file name for the chunk of video content, and broadcasting the generated metadata with the chunk of video content (560). Also disclosed are network elements (200, 400, 600, 700) and a computer program product.

21 Claims, 4 Drawing Sheets

(51) Int. Cl.

| | |
|---|---|
| *H04H 60/27* | (2008.01) |
| *H04N 21/274* | (2011.01) |
| *H04N 21/433* | (2011.01) |
| *H04N 5/76* | (2006.01) |
| *H04N 21/4147* | (2011.01) |
| *G06F 16/40* | (2019.01) |
| *H04N 21/845* | (2011.01) |
| *H04L 29/06* | (2006.01) |
| *H04N 19/176* | (2014.01) |
| *G06F 17/30* | (2006.01) |
| *H04L 29/08* | (2006.01) |
| *H04N 21/2662* | (2011.01) |

(52) U.S. Cl.
CPC ............ *H04H 60/27* (2013.01); *H04H 60/73* (2013.01); *H04L 29/08477* (2013.01); *H04L 63/123* (2013.01); *H04L 65/601* (2013.01); *H04L 67/104* (2013.01); *H04N 5/76* (2013.01); *H04N 19/176* (2014.11); *H04N 21/2662* (2013.01); *H04N 21/274* (2013.01); *H04N 21/4147* (2013.01); *H04N 21/4334* (2013.01); *H04N 21/8456* (2013.01)

(58) Field of Classification Search
CPC ............ H04N 21/4325; H04N 21/4334; H04N 21/4147; H04N 21/4622; H04N 21/8352; H04N 5/76; H04N 5/775; G06F 17/30–17/30194; H04L 12/185; H04L 45/306; H04L 63/0428–63/0823; H04L 67/28–67/327; H04L 67/1097; H04L 9/0643; H04H 60/27; H04H 60/73
See application file for complete search history.

(56) References Cited

U.S. PATENT DOCUMENTS

| | | | |
|---|---|---|---|
| 2003/0093790 A1* | 5/2003 | Logan | G06F 17/30265 725/38 |
| 2004/0025181 A1* | 2/2004 | Addington | H04N 7/17318 725/58 |
| 2006/0265371 A1* | 11/2006 | Edmond | G06F 17/30017 |
| 2008/0229205 A1* | 9/2008 | Lee | G06F 17/30817 715/723 |
| 2011/0052146 A1* | 3/2011 | Murthy | H04N 7/17318 386/243 |
| 2011/0246563 A1* | 10/2011 | Keum | H04N 7/17318 709/203 |
| 2012/0087637 A1* | 4/2012 | Logan | H04H 20/28 386/241 |
| 2012/0151224 A1* | 6/2012 | Koifman | G06F 12/1408 713/193 |
| 2013/0064370 A1* | 3/2013 | Gouge | H04L 63/0428 380/255 |
| 2013/0275618 A1* | 10/2013 | Puttaswamy Naga | H04L 67/2842 709/236 |
| 2013/0290465 A1* | 10/2013 | Harrison | G06F 17/30902 709/213 |
| 2014/0053228 A1* | 2/2014 | Mahadevan | G06F 17/30165 726/1 |
| 2014/0122737 A1* | 5/2014 | Silberstein | G06F 17/30017 709/231 |
| 2015/0089554 A1* | 3/2015 | Phillips | H04N 21/26258 725/92 |
| 2015/0186668 A1* | 7/2015 | Whaley | G06F 21/6218 713/156 |
| 2017/0006324 A1* | 1/2017 | Kolhi | H04N 21/234327 |

* cited by examiner

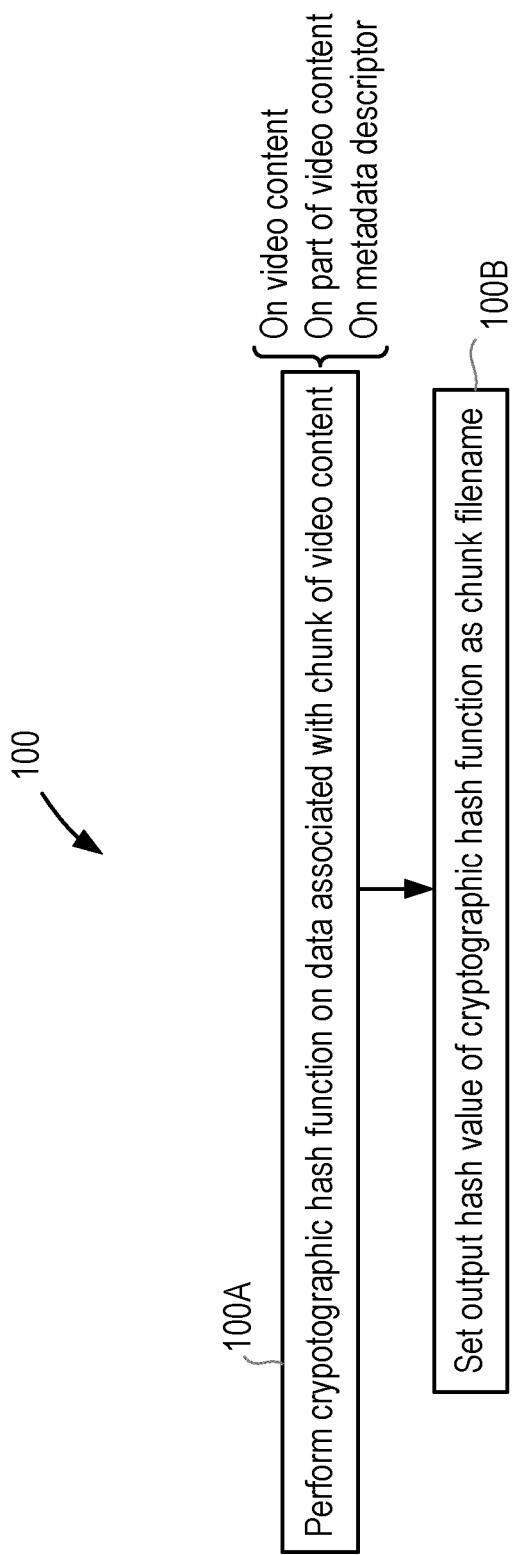
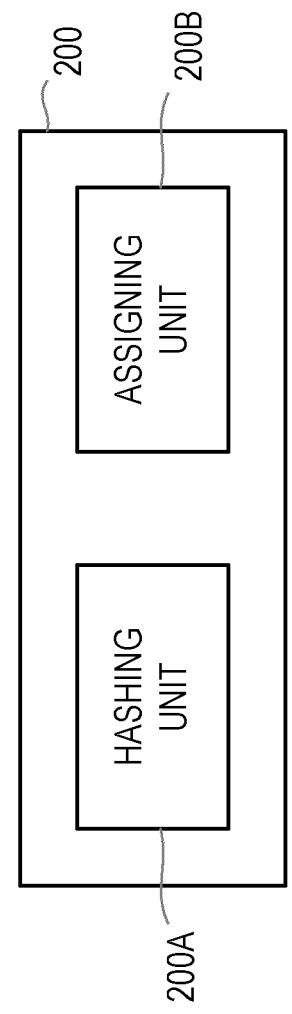
Figure 1
Figure 2

METHODS AND APPARATUS FOR NAMING VIDEO CONTENT CHUNKS

PRIORITY

This nonprovisional application is a U.S. National Stage Filing under 35 U.S.C. § 371 of International Patent Application Serial No. PCT/EP2014/052057, filed Feb. 3, 2014, and entitled "Methods And Apparatus For Naming Video Content Chunks".

TECHNICAL FIELD

The present invention relates to a method and a network element for generating a filename for a chunk of streamed video content. The present invention also relates to a method and a network element for broadcasting a chunk of video content and a method and a network element for recording of broadcast video content by a user device.

BACKGROUND

Adaptive Bitrate Streaming (ABS) is a technique used in streaming multimedia over computer networks which is becoming increasingly popular for the delivery of video services. Current adaptive streaming technologies are almost exclusively based upon HTTP and are designed to operate over large distributed HTTP networks such as the internet. Adaptive HTTP streaming (AHS) supports both video on demand and live video, enabling the delivery of a wide range of video services to users.

Most of the adaptive HTTP streaming techniques require a client to continuously fetch media segments from a server. A certain amount of media time (e.g. 10 sec of media data) is contained in a typical media segment. The server provides a manifest file to the client, which manifest file specifies the Uniform Resource Locators (URLs) that the client should request in order to play back the streamed video. Each manifest item identifies a segment of the video. A single video stream may consist of several manifest files, each identifying segments corresponding to a portion of the stream.

There are two main approaches to storing video segments on the server. In a first approach, the entire video is stored in a single file. Each segment has a specific URL and a server side Application Programming Interface (API) is used to map segment URLs into file ranges or byte ranges. In a second approach, the video is stored in multiple files called chunks, with each chunk usually corresponding to a single segment. The manifest file contains the URLs of the individual chunks. An advantage of this second approach is that the client video player uses normal HTTP requests to request the chunks, as each chunk is an individual file. This approach is therefore well supported by the existing HTTP architecture.

Client video players may display live or on demand video content immediately, fetching and displaying the video segments as the manifest files are made available. Alternatively, broadcast streamed content may be recorded by a client video player and stored for later display. In this case, the client video player fetches and stores the video chunks from the broadcast manifest files, enabling the video chunks to be viewed at a later date. Client storage may be located in the client home, for example in the form of a set top box and hard drive. A new generation of Network Personal Video Recorders (N-PVRs) offers an alternative storage solution, in which a service provider maintains a large number of servers on which a subscriber's media content may be stored. Each individual subscriber is thus offered a private storage area on the network servers.

Network based digital storage offers advantages to the client but places a large demand on network storage. This demand may include significant duplication; the same digital content may be stored multiple times on the network servers if many subscribers choose to record the same video streams, corresponding to popular films or programs for example. Useful economies of storage could in theory be made through the implementation of shared network storage, in which the same digital content could be accessed by several users.

Despite the potential advantages of shared network storage, there are considerable difficulties with managing client access to shared contents. Only users who have programmed their personal video recorders to record a particular video stream should be able to access that stream from the shared storage for later viewing, using the chunk filenames provided in the manifest files at the time of broadcast. However, chunk filenames can be guessed, meaning that a personal video recorder which was not programmed to record a video stream may still access the stored video chunks of the stream from the shared storage by guessing the chunk filenames. This is highly undesirable, as users should only be able to access content that they have recorded at the time of broadcast. The problem of managing client access to shared network media storage is thus one factor inhibiting the implementation of such shared storage for network personal video recorders.

SUMMARY

It is an aim of the present invention to provide a method and apparatus which obviate or reduce at least one or more of the disadvantages mentioned above.

According to a first aspect of the present invention, there is provided a method for generating a filename for a chunk of streamed video content, the method comprising performing a cryptographic hash function on data associated with the chunk of video content, and setting the output hash value of the cryptographic hash function as the chunk filename.

The method for generating a filename for a chunk of streamed video content may be effected in any network node, including for example a broadcast node, a network storage or a user device such as a client personal video recorder.

In some examples, a start point and an end point of the chunk may be specified in metadata associated with the streamed video content.

In some examples, performing a cryptographic hash function on data associated with the chunk of video content may comprise performing a cryptographic hash function on at least part of the video content forming the chunk.

In some examples, the at least part of the video content on which the cryptographic hash function is performed may be specified in metadata associated with the chunk of video content.

In some examples, performing a cryptographic hash function on data associated with the chunk of video content may comprise performing a cryptographic hash function on metadata associated with the streamed video content. In some examples, the metadata may comprise a file name descriptor.

In some examples, the cryptographic hash function may comprise a naming algorithm of an Information Centric Network architecture. In such examples, the chunks may comprise Named Data Objects (NDOs) named according to the naming algorithm of an Information Centric Network (ICN). In this manner, aspects of the present information may support distributed storage of video chunks. An example an Information centric Network is the Network of Information (NetInf).

In some examples, the chunk of video content may be a segment of streamed video content, such as an Adaptive Bitrate Streaming segment.

According to another aspect of the present invention, there is provided a method for recording broadcast video content by a user device. The method comprises receiving a chunk of broadcast video content, generating a filename for the received chunk of video content and storing the generated filename in a user specific storage.

Generating a filename for the received chunk of video content comprises conducting a method according to the first aspect of the present invention.

In some examples, the user specific storage may be located at a user node such as a set top box or other hard drive at a user location. In other examples, the user specific storage may be located in a user specific section of a centrally located network storage.

In some examples, the method may further comprise storing the received chunk of video content under the generated filename in a shared network storage.

In some examples, the method may further comprise checking whether the received chunk of video content is already stored in the shared network storage. Checking may comprise verifying whether a video chunk with the generated filename already exists in the shared network storage.

In some examples, storing the received chunk of video content under the generated filename in a shared network storage may comprise publishing the received chunk under the generated filename to an Information Centric Network.

In some examples, the chunk of video content may be a segment of streamed video content, such as an Adaptive Bitrate Streaming segment.

According to another aspect of the present invention, there is provided a method for broadcasting a chunk of video content, the method comprising generating metadata corresponding to the chunk of video content, the metadata comprising at least one parameter for generating a filename for the chunk of video content, and broadcasting the generated metadata with the chunk of video content.

In some examples, the at least one parameter may comprise a start point and an end point of the chunk of video content.

In some examples, the at least one parameter may comprise start and end points for a part of the chunk of video content to be used for generating a filename for the chunk of video content.

In some examples, the at least one parameter may comprise a descriptor to be used for generating a filename for the chunk of video content.

In some examples, the at least one parameter may comprise a cryptographic hash function for generating the filename of the chunk of video content.

In some examples, broadcasting the generated metadata with the chunk of video content may comprise publishing the chunk of video content and metadata to an Information Centric Network. The Information Centric Network may for example comprise a NetInf network.

In some examples, the chunk of video content may be a segment of streamed video content, such as an Adaptive Bitrate Streaming segment.

According to another aspect of the present invention, there is provided a computer program product configured, when run on a computer, to execute a method according to any one of the preceding aspects of the invention. Examples of the computer program product may be incorporated into an apparatus such as a network element. The computer program product may be stored on a computer-readable medium, or it could, for example, be in the form of a signal such as a downloadable data signal, or it could be in any other form. Some or all of the computer program product may be made available via download from the internet.

According to another aspect of the present invention, there is provided a network element configured for generating a filename for a chunk of streamed video content, the network element comprising a hashing unit configured to perform a cryptographic hash function on data associated with the chunk of video content, and an assigning unit, configured to set the output hash value of the cryptographic hash function as the chunk filename. Units of the network element may be functional units which may be realised in any combination of hardware and/or software.

According to another aspect of the present invention, there is provided a network element for a user device configured for recording broadcast video content, the network element comprising a receiving unit configured to receive a chunk of broadcast video content, a naming unit configured to generate a filename for the received chunk of video content, and a storage unit configured to store the generated filename in a user specific storage. The naming unit may comprise a network element according to the above aspect of the invention. Units of the network element may be functional units which may be realised in any combination of hardware and/or software.

In some examples, the storage unit may be further configured to store the received chunk of video content under the generated filename in a shared network storage.

In some examples, the storage unit may be further configured to publish the received chunk under the generated filename to an Information Centric Network.

According to another aspect of the present invention, there is provided a network element configured for broadcasting a chunk of video content, the network element comprising a generating unit, configured to generate metadata corresponding to the chunk of video content, the metadata comprising at least one parameter for generating a filename for the chunk of video content, and a transmitting unit, configured to broadcast the generated metadata with the chunk of video content. Units of the network element may be functional units which may be realised in any combination of hardware and/or software.

In some examples, the transmitting unit may be further configured to publish the chunk of video content and metadata to an Information Centric Network.

According to another aspect of the present invention, there is provided a network element configured for generating a filename for a chunk of streamed video content, the network element comprising a processor and a memory, the memory containing instructions executable by the processor whereby the network element is operative to perform a cryptographic hash function on data associated with the chunk of video content and set the output hash value of the cryptographic hash function as the chunk filename.

According to another aspect of the present invention, there is provided a network element for recording broadcast video content, the network element comprising a processor and a memory, the memory containing instructions executable by the processor whereby the network element is operative to receive a chunk of broadcast video content, generate a filename for the received chunk of video content, and store the generated filename in a user specific storage. The network element is further operative to generate a filename for the received chunk of video content by performing a cryptographic hash function on data associated with the chunk of video content and setting the output hash value of the cryptographic hash function as the chunk filename.

According to another aspect of the present invention, there is provided a network element for broadcasting a chunk of video content, the network element comprising a processor and a memory, the memory containing instructions executable by the processor whereby the network element is operative to generate metadata corresponding to the chunk of video content, the metadata comprising at least one parameter for generating a filename for the chunk of video content and broadcast the generated metadata with the chunk of video content.

In some examples, the chunk of video content may be a segment of streamed video content, such as an Adaptive Bit Rate streaming segment.

BRIEF DESCRIPTION OF THE DRAWINGS

For a better understanding of the present invention, and to show more clearly how it may be carried into effect, reference will now be made, by way of example, to the following drawings in which:

FIG. 1 is a flow diagram illustrating process steps in a method for naming video chunk files;

FIG. 2 is a block diagram illustrating functional units in a network element configured for naming a chunk file;

DETAILED DESCRIPTION

Figure 3:
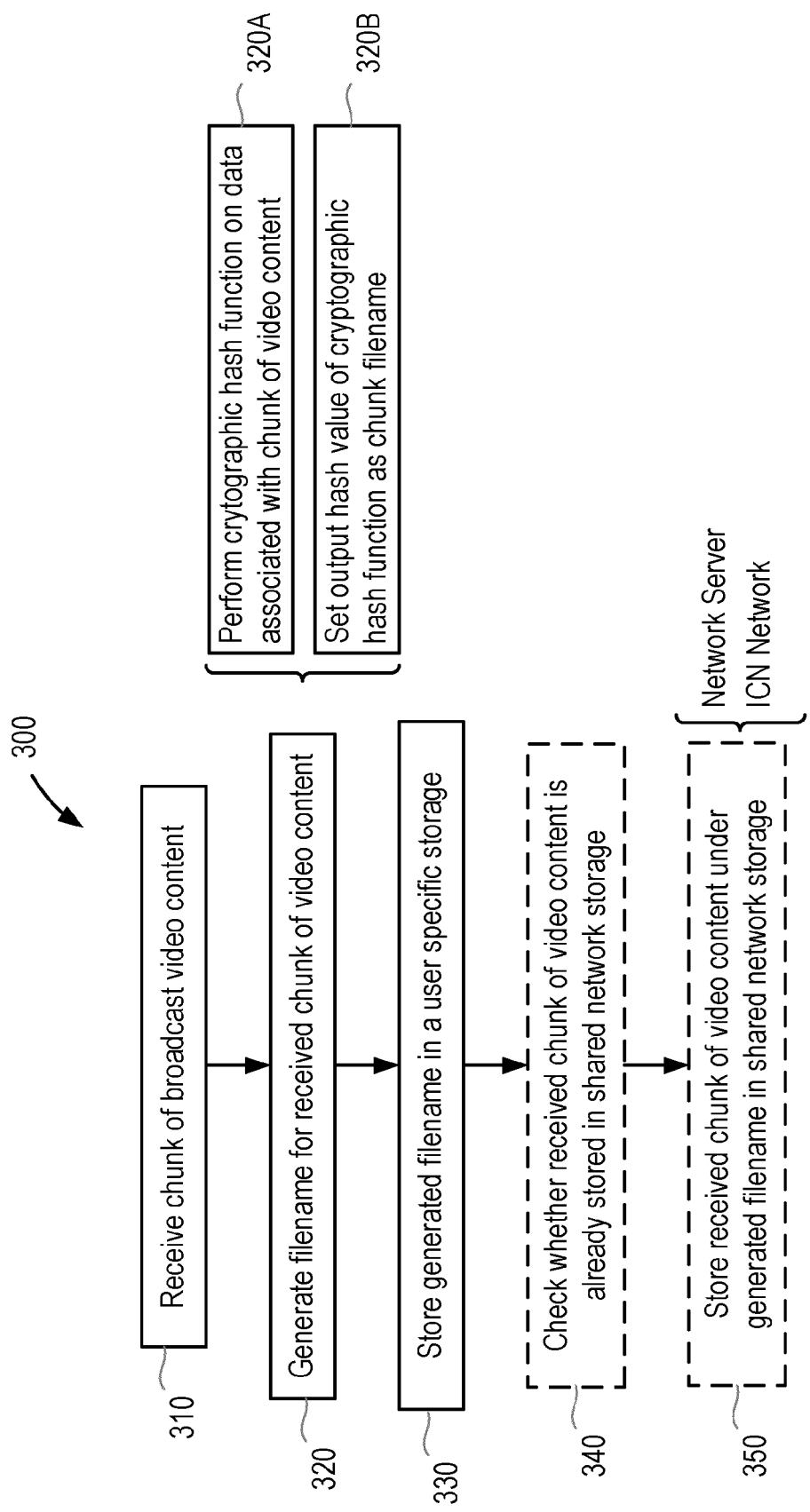
FIG. 3 is a flow diagram illustrating process steps in a method for recording a chunk of video content.

Aspects of the present invention provide the building blocks for a shared network storage of streamed video content in which access to the shared content is enabled by a user electing to record the content as it is broadcast. Despite the fact that all users may have access to the shared storage, only if the user's individual video client was programmed to record a specific stream will the user be able to access that particular stream for later viewing. This controlled access is based upon the method for naming video chunks provided by the present invention, and is facilitated by the methods for broadcasting and recording video content provided by the present invention.

FIG. 1 is a flow chart illustrating a method 100 for generating a filename for a chunk of streamed video content. The chunk may for example be a segment of the streamed content. The method comprises a first step 100A, in which a cryptographic hash function is performed on data associated with the chunk of video content. The method further comprises a second step 100B in which the output of the cryptographic hash function is set as the chunk filename.

The data associated with the chunk of video content may in some examples be the video content itself. Thus the video content forms the input to the cryptographic hash function, and the result of that hash function is set as the file name for the chunk. In another example of the invention, the data associated with the chunk of video content may only be a part of the content. Thus instead of using the whole video segment forming the chunk as the input to the hash function, only a part of the video segment may be used as the hash function input. In another example of the invention, the input to the hash function may be metadata associated with the chunk of video content. For example a dedicated file dame descriptor may be included in the content's metadata to be used as the hash function input.

The hash function used to generate the chunk filename from the associated data may be any suitable cryptographic hash function. An example of a suitable cryptographic hash function is the SHA-256 hash function. In other examples of the invention, the hash function used may be a naming algorithm of an Information Centric Network such as the Network of Information (NetInf). In this manner, the video chunk may become a Named Data Object (NDO) within an ICN network. Use of ICN networks in connection with naming of video content chunks is discussed in further detail below.

The method 100 illustrated in FIG. 1 may be run on any node or network element involved in the broadcasting, recording or storing of video content, including for example a broadcast node, a network storage facility or a user apparatus such as a network personal video recorder (N-PVR).

The method 100 of FIG. 1 may be realised by a computer program which may cause a network element, processor or apparatus to execute the steps of the method 100. FIG. 2 illustrates functional units of a network element 200 which may execute the steps of the method 100, for example according to computer readable instructions received from a computer program. The network element 200 may for example be realised in one or more processors or any other suitable apparatus.

Referring to FIG. 2, the network element 200 comprises a hashing unit 200A and an assigning unit 200B. It will be understood that the units of the network element are functional units, and may be realised in any appropriate combination of hardware and/or software. The hashing unit 200A is configured to perform a cryptographic hash function on data associated with the chunk of video content, and the assigning unit 200B is configured to set the output of the cryptographic hash function as the chunk filename. The network element may for example be a part of a broadcasting node, network storage or user N-PVR.

As discussed above, the method for naming a chunk of video content illustrated in FIG. 1 may form a building block of a system in which shared network storage is provided for users while ensuring access to specific stored content is only available to those users who actually recorded the content. The methods for recording and broadcasting video content described below illustrate how such shared network storage may be realised.

FIG. 3 illustrates a method 300 for recording broadcast video content by a user device. In a first step 310, the method comprises receiving a chunk of broadcast video content. In a second step 320, the method comprises generating a filename for the received chunk of video content. The method then comprises, at step 330, storing the generated filename in a user specific storage. Generating a filename at step 320 comprises performing the steps of the method 100 described above. Step 320 thus comprises a first sub step 320A of performing a cryptographic hash function on data associated with the chunk of video content, and a second sub step 320B of setting the output hash value of the cryptographic hash function as the chunk filename. Additional optional steps 340 and 350 of the method are discussed in further detail below. The chunk of video content may for example be a segment of streamed video content.

The data to be used as the input for the cryptographic hash function in the naming process may be indicated in metadata associated with the chunk of video content. For example, metadata may indicate some or all of the chunk content to be used as the hash function input, or may include a dedicated descriptor to be used as the hash input.

The method 300 of FIG. 3 may be conducted for example at a user N-PVR in order to record a broadcast stream of video content. The method comprises effectively "watching" the streamed content in order to generate the chunk filenames from the content as each chunk of the video stream is fetched. The generated filenames are stored in a user specific storage enabling the user to access the content at a later date, using the generated and stored filenames. The storage may be a user table of contents, including chunk filenames for all streamed content recorded by the user. In some examples, the user specific storage may be located at a user node such as a set top box or other hard drive at a user location. In other examples, the user specific storage may be located in a user specific section of a centrally located network storage. The method 300 thus enables the secure implementation of shared network storage by ensuring that a user may only have access to chunk filenames for a video stream, and so be able to retrieve the video stream from the shared storage, if the user has programmed their personal recorder to record the stream. During recording the personal recorder hashes out the chunk filenames and stores them in the user's own personal storage. Users who have not recorded the broadcast stream will not have been able to generate the chunk filenames and so will not be able to retrieve the chunks from the shared storage. As the filenames are the results of a cryptographic hash function performed on data associated with the video chunks, it is not feasible for a video client to guess the filenames. It is thus ensured that those who have not recorded a video stream cannot access it from the storage.

It will be appreciated that partial recording of a video stream may be possible, for example if a user programs their personal recorded to start recording part way through a broadcast. From the start of recording, the personal recorder is able to hash out the filenames from the appropriate data (chunk content or metadata) and save the filenames for later retrieval. However, it will not be possible to guess the filenames of chunks broadcast before the recorder started recording. Only the portion of the video stream that was recorded may be accessed for later viewing.

In optional additional steps 340 and 350, the method 300 comprises checking whether the received chunk of video content is already stored in a shared network storage, and storing the received chunk of video content in the shared network storage under the generated filename. The method may comprise storing the content only if it is discovered at step 340 that the chunk is not already stored in the shared network storage, so avoiding duplication when multiple users are recording the same content. The step 340 of checking whether the received chunk is already stored in the shared network storage may comprise checking to see whether a file with the filename that has been generated for the video chunk already exists in the shared storage. If such a file already exists, it may be assumed that another recorder has already stored the video chunk in the shared storage, and so the recorder on which the method 300 is running need only store the generated file name in the user specific storage, enabling later retrieval of the video chunk for display.

In one example, the shared network storage may comprise a region of a network server. In other examples, the shared network storage may comprise an ICN network, such as a NetInf network. In such examples, storing the received chunk of video content in the shred storage comprises publishing the video chunk to the ICN network. In such examples, the hash function used in generating a filename for the chunk at step 320 would comprise the naming algorithm for the particular ICN network.

Information Centric Networks are based around Named Data Objects (NDOs). In contrast to historic, host centric networking, in which network architectures are based upon physical storage locations, ICN network architectures focus on delivery of specific content, and make extensive use of caching to achieve more efficient and reliable distribution of content.

An advantage of using an ICN network as network storage is that Information Centric Networks offer support for distributed shared storage. Thus, the shared network storage may comprise not just storage at network servers, but storage available at any node in the ICN network including for example set top boxes, network disk storage and central long tail servers. In one example, a network server and several individual user hard drives may all be connected to an ICN network. A user recording a broadcast video stream in accordance with the method of FIG. 3 may generate filenames for the video chunks using the naming algorithm of the ICN network, may store the filenames in their user specific storage (which may be local or may be at the network server) and may publish the video content chunks to the ICN network. The video content chunks thus become NDOs within the network. When the user wishes to watch the recoded stream at a later time, the user's recorder retrieves the filenames from the user specific storage and retrieves the video chunks from the ICN network to enable normal video playback. The nature of Information Centric Networks means the physical storage location of the video chunks could be anywhere within the ICN network. The recorder thus retrieves the chunks from the most convenient location where they are stored, which could be the network server or could be a hard drive at another user location or any other node within the ICN network holding the NDOs. ICN networks also support the simultaneous use of multiple sources, further increasing efficiency.

The method 300 illustrated in FIG. 3 may be run on any node or network element involved in the recording of video content, including for example a user apparatus such as a network personal video recorder (N-PVR).

Figure 4:
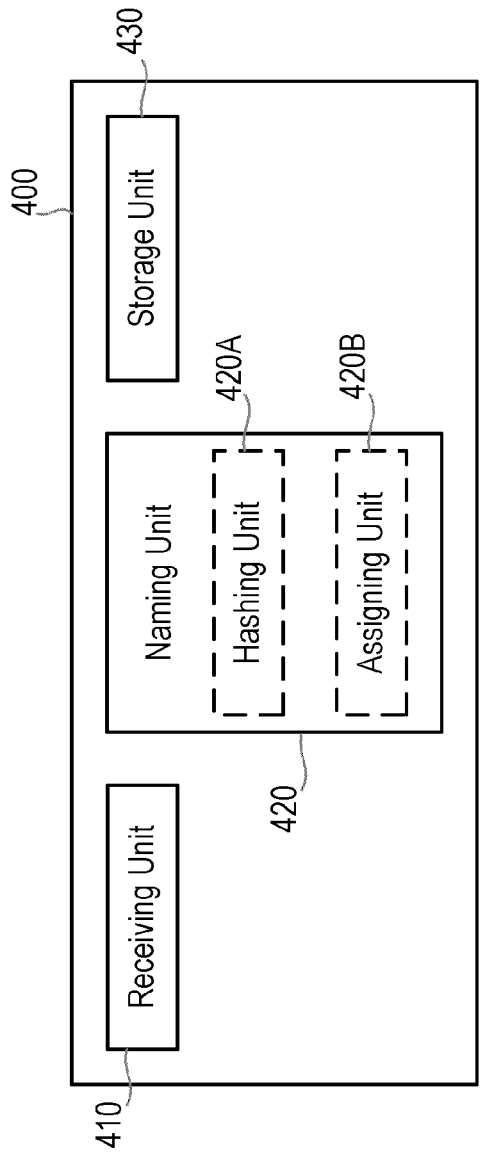
FIG. 4 is a block diagram illustrating functional units in a network element configured to record a chunk of video content.

The method 300 of FIG. 3 may be realised by a computer program which may cause a network element, processor or apparatus to execute the steps of the method 300. FIG. 4 illustrates functional units of a network element 400 which may execute the steps of the method 300, for example according to computer readable instructions received from a computer program. The network element 400 may for example be realised in one or more processors or any other suitable apparatus.

Referring to FIG. 4, the network element 400 comprises a receiving unit 410, a naming unit 420 and a storage unit 430. The naming unit 420 comprises a hashing sub unit 420A and an assigning sub unit 4420B. In some examples, the naming unit 420 may comprise a network element 200 as illustrated in FIG. 2. It will be understood that the units of the network element are functional units, and may be realised in any appropriate combination of hardware and/or software.

The receiving unit 410 of the network element 400 is configured to receive a chunk of broadcast video content. The naming unit 420 is configured to generate a filename for the received chunk of video content, and the storage unit 430 is configured to store the generated filename in a user specific storage. The naming unit 420 is configured to generate a name in accordance with the method of FIG. 1, thus the hashing sub unit 420A is configured to perform a cryptographic hash function on data associated with the chunk of video content, and the assigning sub unit 420B is configured to set the result of the hash function as the filename for the chunk. In some examples, the storage unit 430 may be further configured to check if the video content has already been stored on a shared network storage and, if the content has not been stored, to store the received chunk of video content under the generated filename in the shared network storage. Storing the received chunk of video content may comprise publishing the received chunk under the generated filename to an Information Centric Network.

Figure 5:
FIG. 5 is a flow diagram illustrating process steps in a method for broadcasting video content.

FIG. 5 illustrates process steps in a method 500 for broadcasting a chunk of video content. The method comprises a first step 550 of generating metadata corresponding to the chunk of video content, the metadata comprising at least one parameter for generating a filename for the chunk of video content, and a second step 560 of broadcasting the generated metadata with the chunk of video content. The chunk of video content may for example be a segment of streamed video content.

In some examples, the at least one parameter contained in the generated metadata may comprise a start point and an end point of the chunk of video content. In this manner, it may be assured that chunks are cut identically at all nodes in the network where aspects of the invention are running. This helps to ensure that hash results and chunk file names for the same video chunk will be the same, regardless of the node at which the filenames are generated.

In further examples, the at least one parameter contained in the generated metadata may comprise start and end points for a part of the chunk of video content to be used for generating a filename for the chunk of video content.

In another example, the at least one parameter contained in the generated metadata may comprise a descriptor to be used for generating a filename for the chunk of video content. In such examples, the metadata descriptor may form the input to the hash function described above.

In still further examples, the at least one parameter contained in the generated metadata may comprise a cryptographic hash function for generating the filename of the chunk of video content. In this manner it may be assured that the same hash function is used, and hence the same file names are generated across ass network nodes whether aspects of the present invention are running.

More than one parameter maybe included in the generated metadata. For example the generated metadata may include both start and end points for the video chunk and a cryptographic hash function to be used in generating the chunk filename. In another example, the metadata may include start and end points for the chunk and a name descriptor to be used as a hash input.

The metadata parameters may be included in a Program Map Table (PMT) and/or in a Program Association Table (PAT) associated with the chunk of video content.

In one example, broadcasting the generated metadata with the chunk of video content may comprise publishing the chunk of video content and metadata to an Information Centric Network. The Information Centric Network may for example comprise a NetInf network. In this manner, the video chunk may become a Named Data Object within the ICN network, which object may be retrieved at a later time by any network PVR which has recorded the content by generating the chunk filename at the time of broadcast.

The method 500 illustrated in FIG. 5 may be run on any node or network element involved in the broadcasting of video content.

Figure 6:
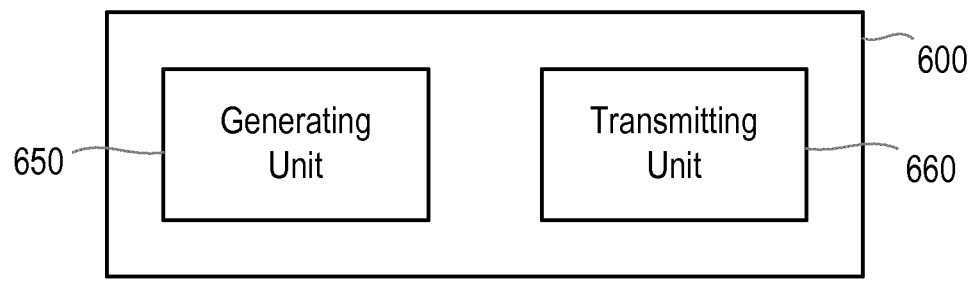
FIG. 6 is a block diagram illustrating functional units of a network element configured to broadcast video content.
Figure 7:
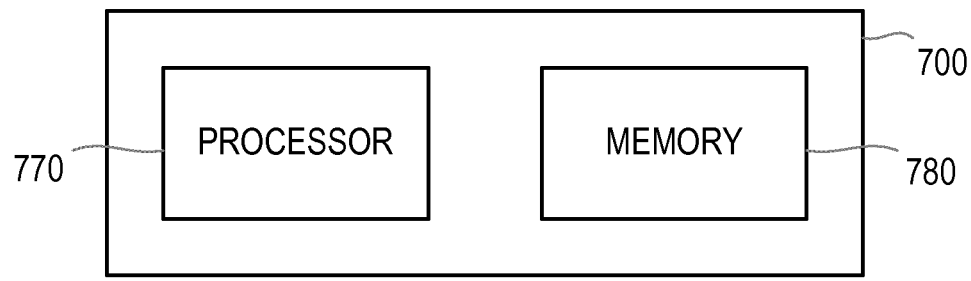
FIG. 7 is a block diagram illustrating a network element.

The method 500 of FIG. 5 may be realised by a computer program which may cause a network element, processor or apparatus to execute the steps of the method 500. FIG. 6 illustrates functional units of a network element 600 which may execute the steps of the method 500, for example according to computer readable instructions received from a computer program. The network element 600 may for example be realised in one or more processors or any other suitable apparatus.

Referring to FIG. 6, the network element 600 comprises a generating unit 650 and a transmitting unit 660. It will be understood that the units of the network element are functional units, and may be realised in any appropriate combination of hardware and/or software.

The generating unit 650 of the network element 600 is configured to generate metadata corresponding to a chunk of video content, the metadata comprising at least one parameter for generating a filename for the chunk of video content. The transmitting unit 660 is configured to broadcast the generated metadata with the chunk of video content. Broadcasting the chunk of video content and associated metadata may comprise broadcasting the content and metadata over a communications network or may comprise publishing the video chunk and metadata to an Information Centric Network.

In further examples according to the present invention, the network elements configured for naming, recording and broadcasting chunks of streamed video content may be implemented as a network element 700 comprising a processor 770 and a memory 780 as illustrated in FIG. 8. The memory 770 contains instructions executable by the processor 780 such that the network element 700 is operative to conduct the steps of the methods 100, 300 and/or 500 as illustrated in FIGS. 1, 3 and 5 described above.

The method of the present invention may be implemented in hardware, or as software modules running on one or more processors. The method may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for generating a filename for a chunk of video content, the method comprising:
   receiving a broadcast of the chunk of video content along with metadata associated with the chunk of video content;
   performing a cryptographic hash function on data associated with the chunk of video content to generate an output hash value, wherein the data associated with the chunk of video content is specified in the metadata associated with the chunk of video content;
   setting the output hash value of the cryptographic hash function as the filename for the chunk of video content;
   storing the filename for the chunk of video content in a user specific storage;
   storing the chunk of video content under the stored filename in a shared network storage; and
   after receiving the broadcast of the chunk of video content and in response to a request to view the stored chunk of video content, providing controlled access to the chunk of video content stored in the shared network storage based on whether the request identifies the chunk of video content using the output hash value of the cryptographic hash function.

2. The method as claimed in claim 1, wherein a start point and an end point of the chunk of video content is specified in the metadata associated with the chunk of video content.

3. The method as claimed in claim 1, wherein performing the cryptographic hash function on the data associated with the chunk of video content comprises performing the cryptographic hash function on at least a part of the video content forming the chunk of video content.

4. The method as claimed in claim 1, wherein performing the cryptographic hash function on the data associated with the chunk of video content comprises performing the cryptographic hash function on the metadata associated with the chunk of video content.

5. The method as claimed in claim 1, wherein the metadata comprises a filename descriptor.

6. The method as claimed in claim 1, wherein the cryptographic hash function comprises a naming algorithm of an Information Centric Network architecture.

7. The method as claimed in claim 1, wherein storing the chunk of video content under the stored filename in the shared network storage comprises:
   checking whether the chunk of video content is already stored in the shared network storage; and
   storing the chunk of video content in the shared network storage in response to determining that the chunk of video content is not already stored in the shared network storage.

8. The method as claimed in claim 1, wherein storing the chunk of video content under the stored filename in the shared network storage comprises publishing the chunk of video content under the stored filename to an Information Centric Network.

9. The method as claimed in claim 1, wherein the metadata comprises at least one parameter for generating the filename for the chunk of video content.

10. The method as claimed in claim 9, wherein the at least one parameter comprises a start point and an end point for a part of the chunk of video content.

11. The method as claimed in claim 9, wherein the at least one parameter comprises a descriptor to be used for generating the filename for the chunk of video content, and wherein the descriptor is an input to the cryptographic hash function.

12. The method as claimed in claim 9, wherein the at least one parameter comprises the cryptographic hash function for generating the filename for the chunk of video content.

13. The method as claimed in claim 1, wherein the chunk of video content comprises a segment of streamed video content.

14. A non-transitory computer-readable medium storing a computer program product which when executed by a computing device, causes the computing device to:
   receive a broadcast of a chunk of video content along with metadata associated with the chunk of video content;
   perform a cryptographic hash function on the metadata broadcasted data associated with the chunk of video content to generate an output hash value, wherein the data associated with the chunk of video content is specified in the metadata associated with the chunk of video content;
   set the output hash value of the cryptographic hash function as a filename for the chunk of video content;
   store the filename for the chunk of video content in a user specific storage;
   store the chunk of video content under the stored filename in a shared network storage; and
   after receipt of the broadcast of the chunk of video content and in response to a request to view the stored chunk of video content, provide controlled access to the chunk of video content stored in the shared network storage based on whether the request identifies the chunk of video content using the output hash value of the cryptographic hash function.

15. The non-transitory computer-readable medium as claimed in claim 14, wherein the metadata comprises the cryptographic hash function for generating the filename of the chunk of video content.

16. A network device configured to generate a filename for a chunk of video content, the network device comprising a processor and a memory, the memory containing instructions executable by the processor whereby the network device is operative to:
   receive a broadcast of the chunk of video content along with metadata associated with the chunk of video content;
   perform a cryptographic hash function on the data associated with the chunk of video content to generate an output hash value, wherein the data associated with the chunk of video content is specified in the metadata associated with the chunk of video content;
   set the output hash value of the cryptographic hash function as the filename for the chunk of video content;
   store the filename for the chunk of video content in a user specific storage;
   store the chunk of video content under the stored filename in a shared network storage; and
   after receipt of the broadcast of the chunk of video content and in response to a request to view the stored chunk of video content, provide controlled access to the chunk of video content stored in the shared network storage based on whether the request identifies the chunk of video content using the output hash value of the cryptographic hash function.

17. The network device as claimed in claim 16, wherein the chunk of video content comprises a segment of video content.

18. The network device as claimed in claim 16, wherein to perform the cryptographic hash function on the data associated with the chunk of video content the network device is configured to perform the cryptographic hash function on at least a part of the video content forming the chunk of video content.

19. The network device as claimed in claim 16, wherein to store the chunk of video content under the stored filename in the shared network storage, the network device is configured to:
- check whether the chunk of video content is already stored in the shared network storage; and
- store the chunk of video content in the shared network storage in response to a determination that the chunk of video content is not already stored in the shared network storage.

20. The network device as claimed in claim 16, wherein the metadata comprises the cryptographic hash function to generate the filename of the chunk of video content.

21. The network device as claimed in claim 16, wherein to store the chunk of video content in the shared network storage, the network device is configured to publish the chunk of video content and the metadata to an Information Centric Network.

* * * * *